(12) United States Patent
Moran et al.

(10) Patent No.: US 9,046,430 B2
(45) Date of Patent: Jun. 2, 2015

(54) METHOD OF REDUCING ROTATION NOISE IN A MAGNETOELASTIC TORQUE SENSING DEVICE

(71) Applicant: Methode Electronics, Inc., Carthage, IL (US)

(72) Inventors: Timothy J. Moran, Chicago, IL (US); Frank Ursetta, Chicago, IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 13/836,602

(22) Filed: Mar. 15, 2013

(65) Prior Publication Data

US 2014/0260686 A1  Sep. 18, 2014

(51) Int. Cl.
G01L 3/02 (2006.01)
G01L 3/10 (2006.01)

(52) U.S. Cl.
CPC ..................................... *G01L 3/102* (2013.01)

(58) Field of Classification Search
CPC .... G01L 3/1435; G01L 3/104; G01R 22/025; B06B 1/08
USPC ..................... 73/862.331–862.335
See application file for complete search history.

(56) References Cited

U.S. PATENT DOCUMENTS

| | | | |
|---|---|---|---|
| 4,442,714 A * | 4/1984 | Bongianni | 73/606 |
| 4,697,460 A | 10/1987 | Sugiyama et al. | |
| 4,896,544 A | 1/1990 | Garshelis | |
| 4,945,305 A * | 7/1990 | Blood | 324/207.17 |
| 4,985,795 A * | 1/1991 | Gooch | 360/115 |
| 5,351,555 A | 10/1994 | Garshelis | |
| 5,520,059 A | 5/1996 | Garshelis | |
| 6,047,605 A | 4/2000 | Garshelis | |
| 6,220,105 B1 | 4/2001 | Cripe | |
| 6,513,395 B1 | 2/2003 | Jones | |
| 6,871,555 B2 | 3/2005 | May | |
| 6,910,391 B1 | 6/2005 | May | |
| 6,959,612 B2 | 11/2005 | May | |
| 7,219,564 B1 | 5/2007 | May | |
| 7,302,867 B2 | 12/2007 | May | |
| 8,087,304 B2 | 1/2012 | Lee | |
| 8,424,393 B1 * | 4/2013 | Lee | 73/862.335 |
| 2009/0107257 A1 | 4/2009 | May | |
| 2009/0230953 A1* | 9/2009 | Lee | 324/244 |
| 2013/0091960 A1* | 4/2013 | Lee | 73/862.335 |

FOREIGN PATENT DOCUMENTS

| | | | |
|---|---|---|---|
| WO | 0113082 A1 | 2/2001 | |
| WO | 02101346 A1 | 12/2002 | |

* cited by examiner

*Primary Examiner* — Max Noori
(74) *Attorney, Agent, or Firm* — Blank Rome LLP

(57) ABSTRACT

A system and method for creating one or more magnetically conditioned regions on a rotatable shaft or disk-shaped torque sensing element, wherein rotation noise produced by the element due to magnetic field variations is substantially negated. Upon magnetization of the torque sensing element, rotation noise produced by the magnetically conditioned region is measured. Adjustment factors are calculated based on the measured rotation noise, and the adjustment factors are used to adjust a magnetic field source during subsequent magnetization of the torque sensing element.

28 Claims, 4 Drawing Sheets

METHOD OF REDUCING ROTATION NOISE IN A MAGNETOELASTIC TORQUE SENSING DEVICE

BACKGROUND OF THE INVENTION

1. Field of Invention

The present invention relates to a system and method for reducing rotation noise in a magnetoelastic torque sensing device. More specifically, the present invention relates to a system and method for creating one or more magnetically conditioned regions on a rotatable shaft or disk-shaped torque sensing element, wherein rotation noise produced by the element due to magnetic field variations is substantially negated.

2. Description of the Related Art

In the control of systems having rotating drive shafts, torque and speed are fundamental parameters of interest. Therefore, the sensing and measurement of torque in an accurate, reliable, and inexpensive manner has long been a primary objective of such control system designs.

U.S. Pat. Nos. 5,351,555 and 5,520,059 to Garshelis, the entireties of which are incorporated by reference herein, describe torque sensing devices that include a shaft, and a ring of magnetoelastically active material disposed around the shaft. U.S. Pat. No. 6,047,605 to Garshelis, the entirety of which is incorporated by reference herein, describes a torque sensing device that does not include a ring, rather, the shaft itself is formed of material that includes a magnetoelastically active region. In each of those torque sensing devices, the magnetoelastically active region includes one or more magnetically conditioned regions that are magnetically polarized in a circumferential direction and possess sufficient magnetic anisotropy to return the magnetization in the region, following the application of torque to the shaft, to the circumferential direction when the applied torque is reduced to zero. When a torque is applied to the shaft, the circumferential magnetic orientations of the magnetically conditioned regions reorient such that they exhibit helical magnetic orientations having both circumferential and axial components. Magnetic field sensors mounted proximate to the magnetically conditioned regions, without contacting the regions, are configured to sense only the axial components of magnetic fields produced by the regions.

Theoretically, when no torque is applied to the shaft of the '555, '059, or '605 patents, no axial magnetic field components are present, and the magnetic field sensors produce no output. When torque is applied to the shaft, axial magnetic field components are produced in proportion to the applied torque, and the magnetic field sensors output electrical signals that are indicative of the applied torque.

U.S. Pat. No. 6,513,395 to Jones, the entirety of which is incorporated by reference herein, describes a torque sensing device that includes a disk-shaped member having a magnetoelastically active region disposed thereon. The magnetoelastically active region includes one or more magnetically conditioned regions that are magnetically polarized in a circumferential direction when no torque is applied to the disk. When a torque is applied to the disk, the circumferential magnetic orientations of the magnetically conditioned regions reorient such that they exhibit circumferential, axial, and radial components. Magnetic field sensors mounted proximate to the magnetically conditioned regions, without contacting the regions, are configured to sense only the axial, or only the radial, components of magnetic fields produced by the regions.

Theoretically, when no torque is applied to the disk of the '395 patent, no axial or radial magnetic field components are present, and the magnetic field sensors produce no output. When torque is applied to the disk, axial and radial magnetic field components are produced in proportion to the applied torque, and the magnetic field sensors output electrical signals that are indicative of the applied torque.

U.S. patent application Ser. No. 13/368,079 to Lee, the entirety of which is incorporated by reference herein, describes a torque sensing device with a disk-shaped member having a magnetoelastically active region that includes magnetically conditioned regions that are magnetically polarized in the axial direction. Magnetic field sensors oriented in a circumferential direction output electrical signals that are indicative of a torque applied to the disk.

Each of the aforementioned torque sensing devices generally incorporates a torque transducer (e.g., ring, shaft, or disk) having a magnetoelastically active region that is formed by first providing a material that possesses sufficient anisotropy to return the magnetization to the quiescent, or initial direction, when the applied torque is reduced to zero. Magnetic anisotropy may be induced by physical working of the transducer or by other methods. Illustrative methods for inducing magnetic anisotropy are disclosed in the '555 and '059 patents.

Following the introduction of magnetic anisotropy to the transducer, the transducer must be polarized in the desired direction or directions (i.e., one or more magnetically conditioned regions must be formed in the magnetoelastically active region). The '555 and '059 patents describe a method of polarizing a transducer by rotating it in the field near two opposite magnetic poles as provided by a horseshoe magnet. The '079 application describes a method of polarizing a transducer by rotating it in the field near a rectangular NdFeB magnet.

During operation, each of the aforementioned torque sensing devices generally incorporates a torque transducer with a magnetically conditioned region that is magnetically polarized in a first direction when the transducer is in the quiescent state (i.e., when no torque is applied to the transducer). One or more magnetic field sensors are mounted proximate to the magnetically conditioned region such that each magnetic field sensor has a sensitive direction that is perpendicular to the first direction. The torque sensing devices rely on the principle that, because the magnetic field sensors are not capable of sensing magnetic field components that are perpendicular to their sensitive directions, each magnetic field sensor produces no output when the transducer is in the quiescent state. When a torque is applied to the transducer, the magnetic field produced by the magnetically conditioned region reorients such that magnetic field components are sensible by the magnetic field sensors, and the magnetic field sensors output electrical signals that are indicative of the applied torque.

Theoretically, the methods used to magnetize (i.e., polarize) the transducers of the prior art torque sensing devices result in consistent dipole alignment in accordance with a magnetic field applied in a particular direction and at a constant strength. However, those prior art transducers often have physical irregularities that may result from inconsistent alloy composition or crystal displacements, or may be otherwise unintentionally introduced during the fabrication process. Such irregularities can result in localized areas within the magnetoelastically active region in which the direction and/or strength of the magnetic field varies from its theoretical value. For example, in theory, a circumferentially polarized region exhibits no magnetic field components in the radial or axial directions while in the quiescent state. However, in actuality, such a region will exhibit radial and/or axial magnetic field components while in the quiescent state due to the aforementioned magnetic field variations. Such magnetic field variations are referred to as rotation noise, and can negatively affect the accuracy of prior art torque sensing devices.

Therefore, there exists a need for a method of magnetizing a torque transducer, wherein the method accounts for physical irregularities in the transducer, and wherein the method results in the elimination of rotation noise when the transducer is used as a torque sensing device. There further exists a need for a system for performing such a method.

SUMMARY OF THE INVENTION

The present invention, as described herein, is generally applicable to the magnetization of any shaft or disk-shaped member that is rotatable about an axis, and is capable of functioning as a torque transducer.

It is a principal object of the present invention to provide a method for magnetizing a torque transducer wherein the magnetization field direction is adjusted during the magnetization process to eliminate rotation noise in the transducer.

It is another object of the present invention to provide a magnetoelastic torque transducer that produces essentially no rotation noise.

It is yet another object of the present invention to provide a system for magnetizing a torque transducer wherein the magnetization field direction is adjusted during the magnetization process to eliminate rotation noise in the transducer.

Briefly described, those and other objects, advantages, and features of the present invention are accomplished, as embodied and fully described herein, by a method for manufacturing a magnetoelastic torque sensing device, the method comprising the steps of: forming an initial magnetically conditioned region at a first location on magnetoelastic element; measuring magnetic fields produced by various portions of the initial magnetically conditioned region; calculating adjustment factors based on the measured magnetic fields; removing the initial magnetically conditioned region from the magnetoelastic element; and forming a final magnetically conditioned region at the first location on the magnetoelastic element, wherein magnetic fields produced by the final magnetically conditioned region have been adjusted based on the adjustment factors.

Those and other objects, advantages, and features of the present invention are accomplished, as embodied and fully described herein, by a magnetoelastic torque sensing device manufactured by the above method. The torque sensing device may include a disk-shaped member or may include a shaft.

Furthermore, those and other objects, advantages, and features of the present invention are accomplished, as embodied and fully described herein, by a system for manufacturing a magnetoelastic torque sensing device, the system comprising: a DC magnetic field source; a holder configured to hold the DC magnetic field source in proximity to a magnetoelastic element; a magnetic field sensor configured to sense a magnetic field produced by the magnetoelastic element; and a computer system configured to control a position of the holder based on information received from the magnetic field sensor. The holder may be rotatable about an axis that is perpendicular to a surface of the magnetoelastic element, or may be rotatable about an axis that is perpendicular to a plane that is tangent to a surface of the magnetoelastic element. The DC magnetic field source may comprises a permanent magnet having a solenoid disposed therearound, wherein a central axis of the solenoid is perpendicular to a magnetic orientation of the permanent magnet.

With those and other objects, advantages, and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENTS

Figure 1:
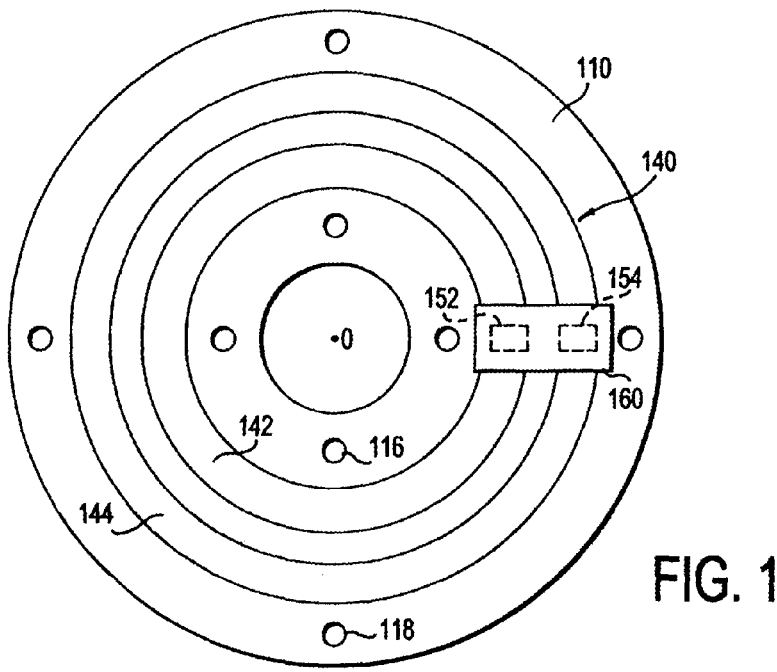
FIG. 1 is a top view of an exemplary disk, which may be magnetized in accordance with an embodiment of the present invention.

Several preferred embodiments of the invention are described for illustrative purposes, it being understood that the invention may be embodied in other forms not specifically shown in the drawings. The figures herein are provided for exemplary purposes and are not drawn to scale.

Turning first to FIG. 1, shown therein is a top view of an exemplary disk-shaped member (i.e., disk) 110, which may be magnetized in accordance with the present invention. It should be noted that the invention can also be used with a shaft as the torque transducing element. The disk 110 is formed of ferromagnetic material and is, or at least includes, a magnetoelastically active region 140. The material selected for forming the disk 110 must be at least ferromagnetic to ensure the existence of magnetic domains for at least forming a remanent magnetization in the magnetoelastically active region 140, and must be magnetostrictive such that the orientation of magnetic field lines in the magnetoelastically active region 140 may be altered by the stresses associated with applied torque. The disk 110 may be completely solid, or may be partially hollow. The disk 110 may be formed of a homogeneous material or may be formed of a mixture of materials. The disk 110 may be of any thickness, and is preferably about 3 mm thick.

The top and bottom surfaces of the disk 110 may be flat, or may have variable thickness in cross-section from the center of the disk 110 to the outer edge. However, the portion of the disk that constitutes the magnetoelastically active region 140 is preferably flat. When intended for use in automotive applications, for example, the disk 110 may include inner holes 116 and outer holes 118 to allow for attachment to drivetrain elements such as engines and transmissions.

After magnetization, the magnetoelastically active region 140 of the disk 110 includes one or more magnetically conditioned regions 142, 144. Preferably the disk 110 includes at least two radially distinct, annular, oppositely polarized magnetically conditioned regions 142, 144, defining the magnetoelastically active region 140 of the disk 110. Inner magnetically conditioned region 142 and outer magnetically conditioned region 144 may be formed with or without a gap therebetween. In other exemplary disks, the magnetoelastically active region may include less than two, or more than two magnetically conditioned regions.

When the disk 110 is used as a torque sensing device, magnetic field sensors 152, 154 are positioned proximate to the magnetoelastically active region 140, such that each magnetic field sensor 152, 154 is placed over a corresponding magnetically conditioned region 142, 144. The magnetic field sensors 152, 154 are oriented such that their sensitive directions are perpendicular to the direction of magnetization in the corresponding magnetically conditioned regions 142, 144. That configuration ensures that the indicative signals outputted by the magnetic field sensors 152, 154 vary linearly with respect to variations in the torque applied to the disk 110. The magnetic field sensors 152, 154 may be mounted on one or more sensor platforms 160, which maintain the magnetic field sensors' proximity to the disk 110, while preventing them from contacting the disk 110.

During use as a torque sensing device, the disk 110 may rotate many times per second, causing different parts of the disk 110 to be near the magnetic field sensors 152, 154 at different times. The torque sensing device may therefore include multiple sensor platforms 160, which may reduce the negative effects of rotation noise. Preferably, the polarities of the two magnetically conditioned regions 142, 144 are anti-parallel for a particular angular position on the disk 110, which allows the torque sensing device to cancel the undesired effects of far-field magnetic noise. Exemplary magnetic field sensor arrangements are described in the '079 application.

A method for magnetizing the exemplary disk 110 of FIG. 1 may include placing permanent magnets proximate to the disk 110 as the disk 110 it is rotated, thus creating the inner and outer magnetically conditioned regions 142, 144. Such a method is described in the '079 application. After the magnets are removed, the magnetically conditioned regions 142, 144 may, for example, have remanent magnetization states that are substantially circumferential. However, because the chemical composition and/or the crystalline structure of the disk 110 is not homogeneous, or due to other factors, the remanent magnetization produced is not entirely circumferential, but instead exhibits radial magnetic field components that are not uniform for different angular positions of the disk 110. Those non-uniformities contribute to a rotation noise pattern of the disk 110, which has been found to be repeatable even if the disk 110 has been degaussed and remagnetized on multiple occasions.

Figure 2:
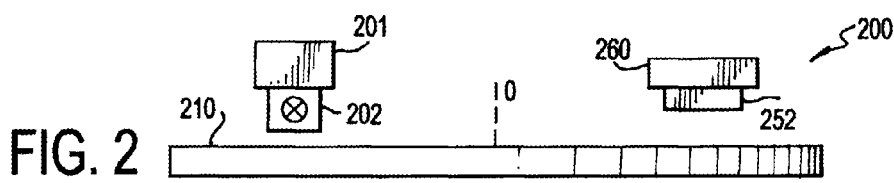
FIG. 2 is a side view of a system for magnetizing a disk in accordance with an embodiment of the present invention.
Figure 3:
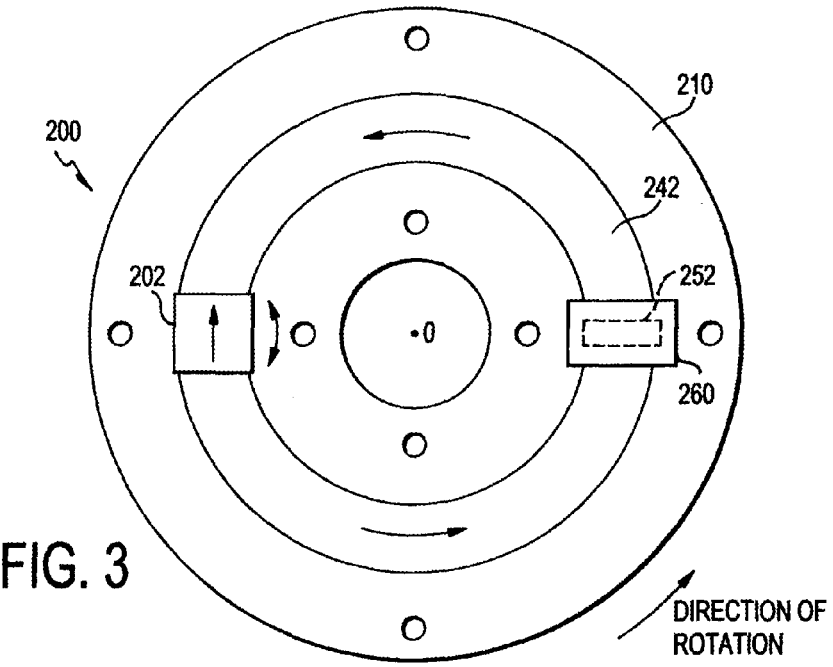
FIG. 3 is a top view of a system for magnetizing a disk in accordance with an embodiment of the present invention.

FIGS. 2 and 3 illustrate a system 200 for performing a process by which a magnetically conditioned region 242 may be formed on an annular portion of an exemplary disk 210. FIG. 2 shows a side view of the disk 210, and FIG. 3 shows a top view of the disk 210. For simplicity, the system 200 illustrated in FIGS. 2 and 3 is applicable to a process in which only a single magnetically conditioned region 242 (or magnetically conditioned "band") is formed on the disk 210. However, processes for forming two or more magnetically conditioned regions on the disk 210 are within the scope of the invention, and will be understood in view of the description and drawings provided herein.

The system 200 includes a magnet holder 201 for holding a magnetizing magnet 202 proximate to a surface of the disk 210. The X in FIG. 2, and the arrow in FIG. 3, shown on the magnetizing magnet 202, indicate that the magnetizing magnet 202 has a magnetic orientation that is parallel to the surface of the disk 210 in the circumferential direction. The magnet holder 201 may be capable of rotating about a central axis of the magnetization magnet 202 perpendicular to the surface of the disk, such that the magnetic orientation of the permanent magnet 202 deviates from the circumferential direction, but remains parallel to the surface of the disk 210. The rotational ability of the magnet holder 201, shown in FIG. 2, is indicated by the arrows shown to the right of the magnetizing magnet 202 in FIG. 3.

The system 200 further includes a magnetic field sensor 252 for measuring the magnetic field produced by the magnetically conditioned region 242. Magnetic field sensors 252 are known in the art and include magnetic field vector sensor devices such as flux-gate inductors, Hall Effect sensors, and the like. The magnetic field sensor 252 is mounted on a sensor platform 260, which holds the magnetic field sensor 252 proximate to the surface of the disk 210.

The system 200 further includes a computer system (not shown), which may include one or more computing devices. The computer system is capable of receiving, storing, and analyzing data, including measurement data produced by the one or more magnetic field sensors 252, as well as data indicating the angular position of the disk 210. The computer system is also capable of producing output to control the position (e.g., rotation angle) of the one or more magnetization magnets 202 and/or controlling one or more solenoid currents as discussed in further detail below. Accordingly, the computer system may include one or more memory devices and one or more processors, and may be capable of executing one or more software algorithms in order to perform steps in accordance with the present invention.

Figure 4:
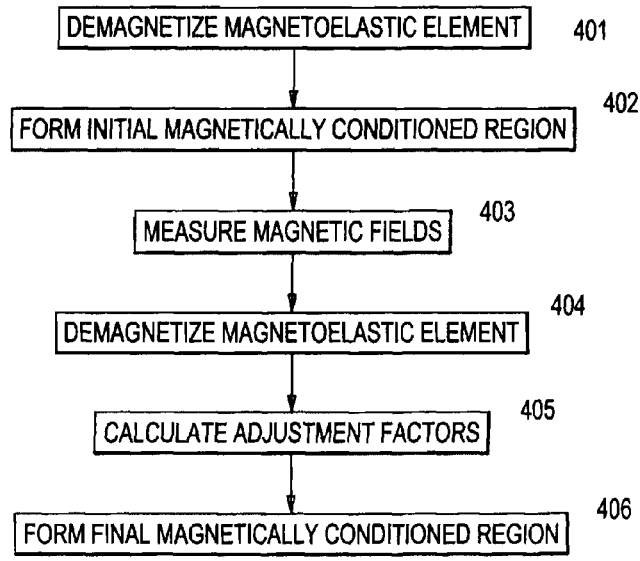
FIG. 4 is a flow chart illustrating a method for manufacturing a magnetoelastic torque sensing device in accordance with an embodiment of the present invention.

FIG. 4 is a flowchart illustrating exemplary steps for forming a magnetically conditioned region 242 on the disk 210, such that the magnetically conditioned region 242 exhibits little or no rotation noise, in accordance with the present invention.

In step 401, the magnetization status of the disk 210 is randomized (i.e., the disk 210 is degaussed/demagnetized). Demagnetization may be accomplished by bringing an AC magnetic field source near the magnetoelastically active region of the disk 210, while the disk 210 rotates about its central axis O. The introduction of the AC magnetic field results in many small magnetic domains with random orientations being produced at various parts of the magnetoelastically active region 240. Accordingly, the net magnetic field produced by the magnetoelastically active region 240 is small. Alternatively, a disk 210 having a magnetoelastically active region 240 with no net magnetization may be provided, in which case randomization step 401 is not required.

In step 402, a magnetically conditioned region 242 is formed on the disk 210 by bringing a DC magnetic field source, such as a permanent magnetization magnet 202, near the surface of the disk 210, while the disk 210 rotates about its central axis O. In a preferred embodiment, the magnetization magnet 202 is a permanent NdFeB magnet. In the non-limiting example shown in FIG. 3, during formation of the magnetically conditioned region 242, the magnetization magnet 202 is held with its magnetic orientation in a clockwise circumferential direction while the disk 210 is rotated in a counter-clockwise direction. That results in the formation of a magnetically conditioned region 242 that is generally polarized in a counter-clockwise circumferential direction, opposite the magnetic orientation of the permanent magnet 202. The arrows in FIG. 3, shown in the magnetically conditioned region 242, indicate that the magnetically conditioned region 242 has a magnetic orientation that is generally in the counter-clockwise circumferential direction.

It will be understood that, while only one magnetically conditioned region 242 is shown in FIG. 3 for simplicity, step 402 may include the positioning of two or more magnetization magnets near the surface of the disk 210 in order to form two or more magnetically conditioned regions thereon. The 079 application describes an exemplary process for forming multiple magnetically conditioned regions on a disk that is consistent with step 402.

Step 402 results in the formation of a magnetically conditioned region 242 (or regions) that is generally polarized in a circumferential direction. However, due to physical irregularities in the disk 210, or for other reasons, the polarization of the magnetically conditioned region 242 is slightly non-circumferential. For instance, portions of the magnetically conditioned region 242 may produce magnetic fields having radial components. Moreover, the polar deviation from the circumferential direction is different at different angular portions of the magnetically conditioned region 242. Accordingly, following step 402, the magnetically conditioned region 242 exhibits undesirable rotation noise. It has been found that the rotation noise pattern of a particular disk is repeatable. In other words, a specific angular portion of the magnetically conditioned region will exhibit the same rotation noise after its initial magnetization as it exhibits after subsequent demagnetization and remagnetization, provided the same process is used for the magnetization and remagnetization.

In step 403, the magnetization magnet 202 is removed from the proximity of the disk 210, and the magnetic field sensor 252 is used to measure the magnetic field produced by different angular portions of the magnetically conditioned region 242 when the disk 210 is in the quiescent state. In performing step 403, a series of discrete measurements are taken, each discrete measurement corresponding to a different angular position of the disk 210.

For example, to obtain a first discrete measurement, a stationary magnetic field sensor 252 may be positioned proximate to the magnetically conditioned region 242 while the disk 210 is in the quiescent state. The magnetic field sensor 252 is positioned with its sensitive direction parallel to the surface of the disk 210 in the radial direction so that the magnetic field sensor 252 will not generate an output based on the desired circumferential magnetic field components produced by the magnetically conditioned region 242. However, the magnetic field sensor 252 will generate an output based on undesired radial magnetic field components produced by the magnetically conditioned region 242, which can result from the physical irregularities present during magnetization of the disk 210 in step 402. The computer system stores the output of the magnetic field sensor 252 (i.e., the rotation noise measurement), along with a value representing the corresponding angular position of the disk 210. The value representing the angular position of the disk 210 may be provided to the computer system by an additional angular position sensor (not shown). Alternatively, or in addition, the computer system may be configured to control the angular position of the disk according to an algorithm provided thereon.

A second discrete measurement may be obtained by slightly rotating the disk 210 to a second angular position and allowing the disk 210 to remain in the quiescent state. The magnetic field sensor 252 then acquires a second rotation noise measurement, which is stored, along with a value representing the second angular position. Preferably, the process of obtaining discrete measurements is repeated until the disk 210 has undergone at least one full 360 degree rotation, and a data map has been created for the disk 210. For each angular position of the disk 210, the data map includes a corresponding rotation noise measurement. By increasing the number of angular positions at which discrete measurements are obtained, the resolution of the data map is increased, and the effectiveness of the invention is improved. In a preferred embodiment, discrete measurements are obtained for 360 distinct angular positions of the disk 210. It is contemplated that, for a disk 210 having more than one magnetically conditioned region 242, multiple magnetic field sensors 252 may be used to measure rotation noise, and the resulting data map will include rotation noise data for each of the magnetically conditioned regions 242. It should be noted that a slight torque may be applied to the disk 210 during the measurement process so that the rotational speed of the disk 210 remains substantially consistent. However, the value of that slight torque is orders of magnitude less than those of typical torques that would be applied to the disk 210 during its actual use in a torque sensing device application. Accordingly, any slight torque applied to the disk 210 during the measurement process does not negatively affect the measurements obtained.

In step 404, the magnetization status of the disk 210 is again randomized. In other words, in step 404, the magnetically conditioned region 242 formed during step 402 is degaussed using a process similar to that described with respect to step 401. For example, step 404 may involve positioning an AC magnetic field source near the magnetically conditioned region 242, while the disk 210 rotates about its central axis O. The demagnetization step is beneficial because it erases all previously magnetized regions on the disk 210, and allows for adjustments made during subsequent remagnetization to have a predictable influence on the magnetization status of the disk 210. However, it should be noted that demagnetization of the disk 210 is not always necessary to achieve the desired results of the disclosed method (i.e., reduced rotation noise). Therefore, step 404 is not a required step.

In step 405, the computer system calculates adjustment factors based on the measurements obtained in step 403. In an exemplary embodiment of the invention, the adjustment factors include, for each angular position of the disk 210, an adjustment angle value for the magnetization magnet 202. In calculating the adjustment factors, the computer system analyzes the data map, and determines an angle by which the magnetization magnet 202 should be offset during subsequent remagnetization of the disk 210 at each angular position, so that the corresponding portion of the magnetically conditioned region 242 will not produce rotation noise after remagnetization.

For example, after the magnetically conditioned region 242 is formed using a circumferentially polarized magnetization magnet 202 in accordance with step 402, the magnetic field sensor 252 may, in step 403, measure a slight radial magnetic field component produced by a first angular portion of the magnetically conditioned region 242 when the disk 210 is in the quiescent state. That radial component is, of course, undesired rotation noise. In step 405, the computer system may determine that by offsetting the polarity of the magnetization magnet 202 from the circumferential direction by one degree during formation of the first angular portion of the magnetically conditioned region 242, that portion will not produce any radial magnetic field component when the disk 210 is in the quiescent state, after formation of the magnetically conditioned region 242 is complete. Accordingly, the computer system will generate an adjustment factor of one degree for the angular position of the disk 210 corresponding to the first angular portion of the magnetically conditioned region 242. It should be noted that step 405 is independent of step 404. Therefore, in instances in which step 404 is performed, step 405 may be performed before, after, or concurrently with step 404.

In step 406, a new magnetically conditioned region 242 is formed on the disk 210 by a process similar to that described in step 402, in the same location as the magnetically conditioned region formed in step 402. However, during step 406, the computer system monitors the angular position of the disk 210 during its rotation, and the angular offset of the magnetization magnet 202 is continuously adjusted based on the angular position of the disk 210 and the previously calculated adjustment factors. The angular offset of the magnetization magnet 202 may be adjusted by rotating the magnet holder 201 to which the magnetization magnet 202 is attached. The angular offset of the magnetization magnet 202 during remagnetization of the disk 210 in step 406 cancels the undesired effects of the physical irregularities of the disk 210, which can result in rotation noise.

Figure 5:
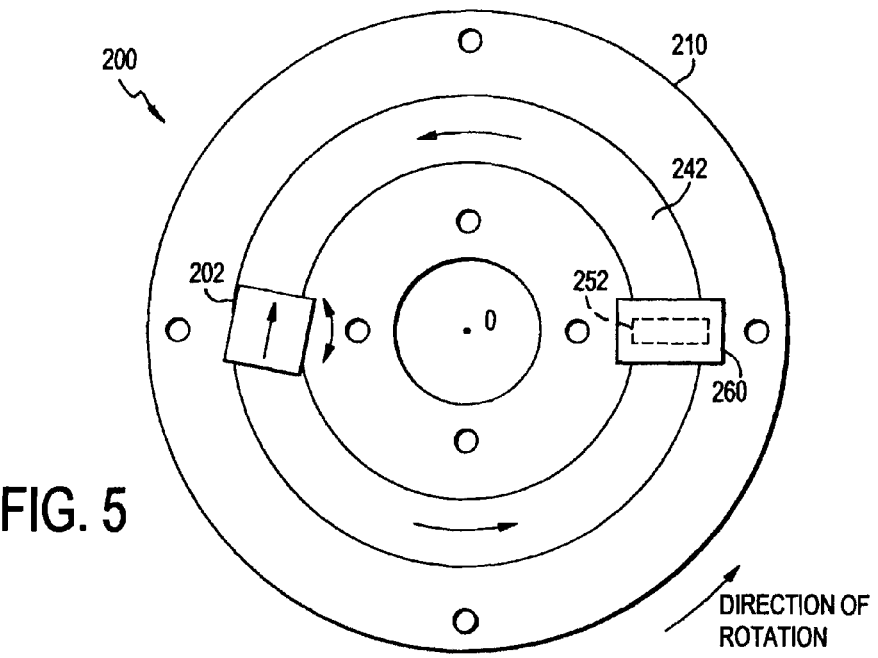
FIG. 5 is a top view of a system for magnetizing a disk in accordance with an embodiment of the present invention.

FIG. 5 illustrates the disk 210 during the performance of step 406. As shown in FIG. 5, the polarity of the magnetization magnet 202 is slightly offset from the circumferential direction according to an adjustment factor that corresponds to the angular portion of the magnetically conditioned region 242 located directly beneath the magnetization magnet 202. Because adjustment factors may differ for different angular positions of the disk 210, the angular offset of the magnetization magnet 202 may be adjusted many times during each single rotation of the disk 210. In performing step 406, the disk 210 may rotate many times around its central axis O, during which time the magnetization magnet 202 is brought into the proximity of the surface of the disk 210, held near the disk 210 for several rotations, and then removed from the proximity of the disk 210. Following remagnetization of the disk 210 in accordance with step 406, the magnetically conditioned region 242 produces substantially no rotation noise.

Figure 6:
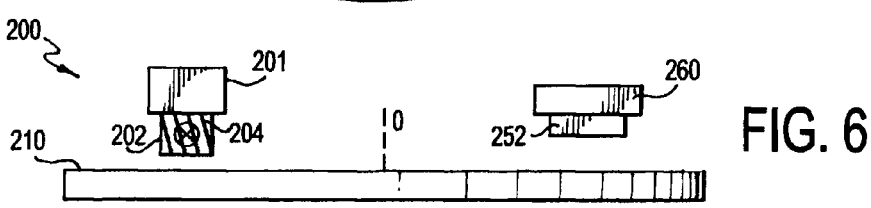
FIG. 6 is a side view of a system for magnetizing a disk in accordance with an embodiment of the present invention.
Figure 7:
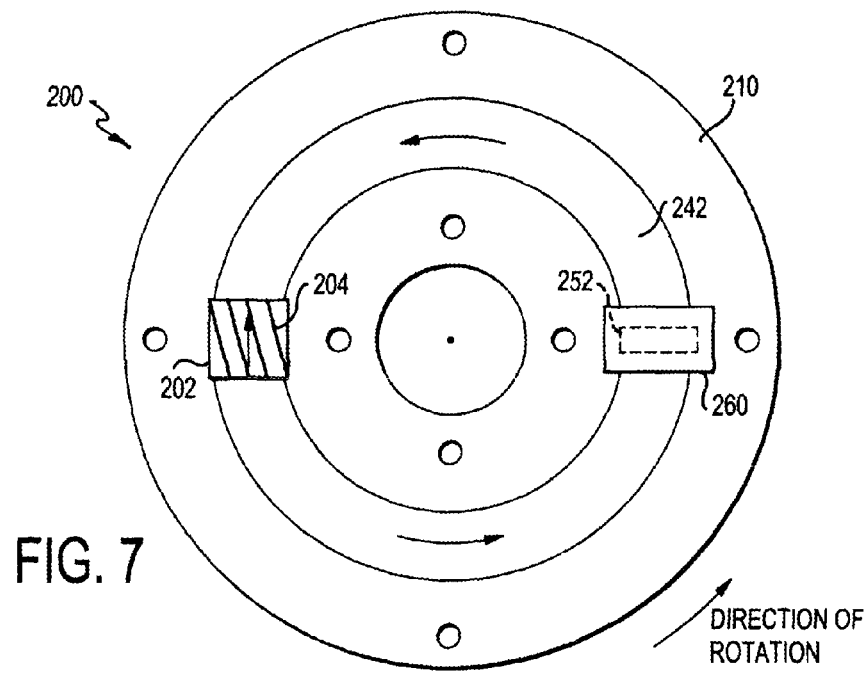
FIG. 7 is a top view of a system for magnetizing a disk in accordance with an embodiment of the present invention.

FIGS. 6 and 7 illustrate the system 200 for forming a magnetically conditioned region 242 on a disk 210, in accordance with an alternate exemplary embodiment of the present invention. FIG. 6 shows a side view of the disk 210, and FIG. 7 shows a top view of the disk 210. As in FIGS. 2 and 3, the magnetic orientation of the permanent magnetization magnet 202 in FIGS. 6 and 7 is in the circumferential direction. However, unlike FIGS. 2 and 3, FIGS. 6 and 7 show the system 200 further including a solenoid 204 disposed around the magnetization magnet 202, the central axis of the solenoid 204 oriented in the radial direction, perpendicular to the magnetic orientation of the magnetization magnet 202. The solenoid 204 is disposed such that, when an electrical current is applied thereto, the combination of the solenoid 204 and the magnetization magnet 202 forms an additional electromagnet, which is magnetically oriented in the radial direction. For simplicity, the solenoid 204 in FIGS. 6 and 7 is shown having four turns. However, the solenoid preferably includes more than four turns, and will typically include approximately 150 turns. It should be noted that the solenoid 204 may be positioned in proximity to, but not around, the magnetization magnet 202.

In this alternate embodiment of the present invention, the adjustment factors calculated during step 405 include, for each angular position of the disk 210, an adjustment current value for the solenoid 204. In calculating the adjustment factors, the computer system analyzes the data map produced in step 403, and determines an electrical current that should be applied to the solenoid 204 during subsequent remagnetization of the disk 210 at each angular position, so that the corresponding portion of the magnetically conditioned region 242 will not produce rotation noise after remagnetization.

For example, in step 405, the computer system may determine that by applying a direct current of 100 mA to the solenoid 204 during formation of a first angular portion of the magnetically conditioned region 242, that portion will not produce any radial magnetic field component when the disk 210 is in the quiescent state, after formation of the magnetically conditioned region 242 is complete. Accordingly, the computer system will generate an adjustment factor of 100 mA for the angular position of the disk 210 corresponding to the first angular portion of the magnetically conditioned region 242.

With continued reference to the alternative embodiment of the present invention, during step 406, the computer system monitors the angular position of the disk 210 during its rotation, and causes an electrical current to be applied to the solenoid 204, the electrical current being continuously adjusted based on the angular position of the disk 210 and the previously calculated adjustment factors. The electrical current applied to the solenoid 204 during remagnetization of the disk 210 in step 406 cancels the undesired effects of the physical irregularities of the disk 210, which can result in rotation noise.

In other exemplary embodiments of the present invention, formation of the magnetically conditioned region 242 may be achieved by performing a rapid adjustment process. In that process, the magnetic field sensor 252 obtains discrete magnetic field measurements for corresponding angular positions of the disk 210 while the disk 210 rotates. Adjustment factors (e.g., angular offsets or adjustment current values) are calculated for each angular position of the disk 210 based on the corresponding magnetic field measurement. Simultaneously, the magnetization magnet 202 is in proximity to the disk 210, and is being adjusted such that when a particular angular portion of the magnetically conditioned region 242 is beneath the magnetization magnet 202, the most recent adjustment factor for the corresponding angular position is applied to the magnetization magnet 202. Adjustment of the magnetization magnet may be accomplished, for example, by applying an angular offset to the magnetization magnet 202, or applying an electrical current to the adjustment solenoid 204. The process, which involves the rapid measurement of magnetic fields, calculation of adjustment factors, and adjustment of the magnetization magnet 202, continues during several rotations of the disk 210. Preferably, the process continues until the magnetic field sensors 252 indicate an acceptably low level of rotation noise for the entire magnetically conditioned region 242. When the level of rotation noise is acceptably low, the process of measurement, calculation, and adjustment continues as the magnetization magnet 210 is slowly withdrawn from the proximity of the disk 210, after which the process is complete.

Figure 8:
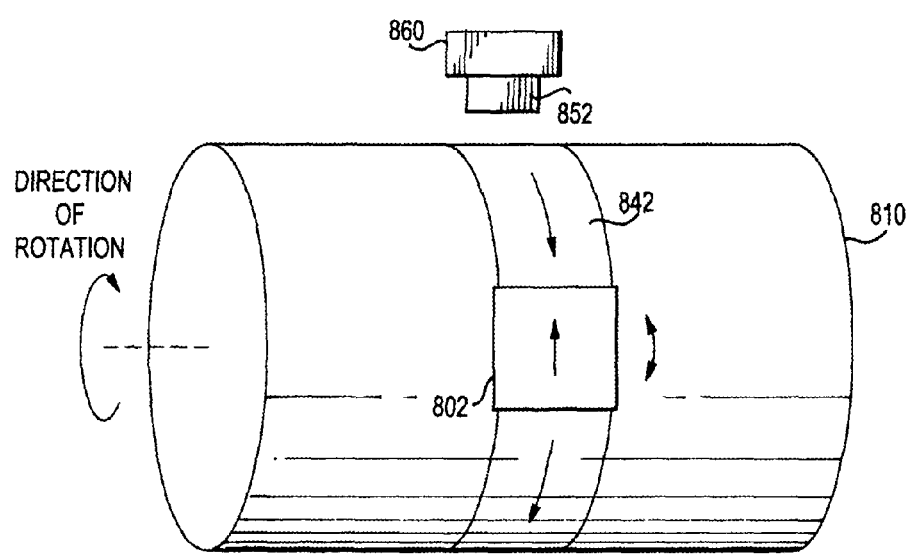
FIG. 8 is a side view of a system for magnetizing a shaft in accordance with an embodiment of the present invention.
Figure 9:
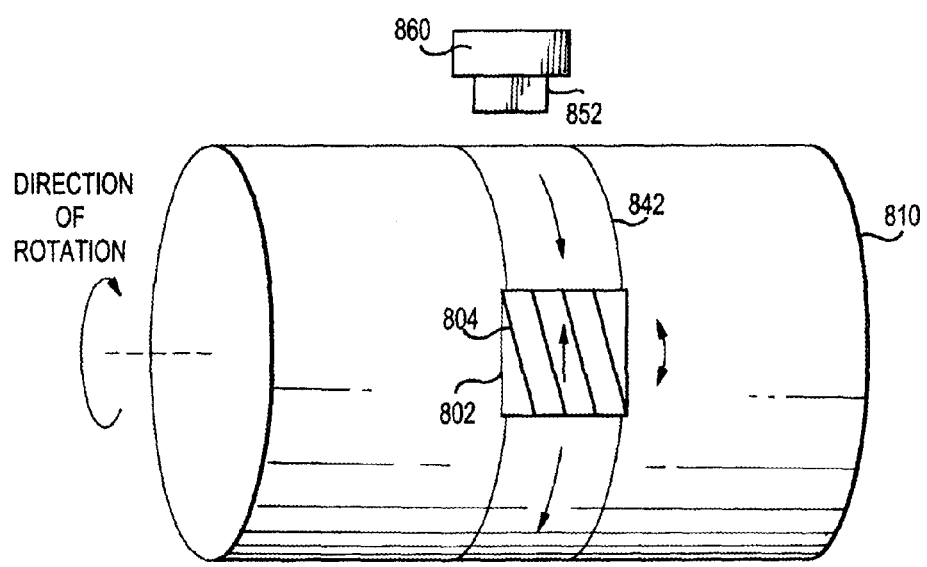
FIG. 9 is a side view of a system for magnetizing a shaft in accordance with an embodiment of the present invention.

It should be noted that the entirety of the above disclosure with respect to a disk-shaped torque sensing device is analogously applicable to other types of torque sensing devices, such as shafts, rings, etc. FIGS. 8 and 9 illustrate other alternate exemplary embodiments of the present invention as applied to the magnetization of a shaft-type torque sensing device. According to the method described above with respect to FIG. 4, a shaft 810 having a magnetoelastically active region is provided. A magnetization magnet 802 may be used to form a generally circumferentially polarized magnetically conditioned region 842 on the shaft 810. However, after that initial magnetization, portions of the magnetically conditioned region 842 may produce magnetic fields having undesired axial components (i.e., rotation noise). A magnetic field sensor 852 having an axially oriented sensitive direction, and disposed on a sensor platform 860, may be used to obtain rotation noise measurements that correspond to different angular positions of the shaft 810. Those rotation noise measurements may be used to calculate adjustment factors that include adjustment angles for the magnetization magnet 802, or adjustment current values for a solenoid 804. The shaft 810 is demagnetized, if necessary, and a new magnetically conditioned region 842 is formed on the shaft 810 during a remagnetization step. During the remagnetization of the shaft 810, the angular offset of the magnetization magnet 802, or the electrical current applied to the solenoid 804, is continuously adjusted based on the adjustment factors, so as to result in the formation of a magnetically conditioned region 842 that produces substantially no rotation noise. For example, as shown in FIG. 8, the magnetization magnet 802 may be rotated about an axis that is perpendicular to a plane that is tangent to a surface of the shaft 810. For simplicity, the shaft 810 shown in FIGS. 8 and 9 includes only a single magnetically conditioned region 842 formed thereon. However, processes for forming two or more magnetically conditioned regions on the shaft 810 are within the scope of the invention, and will be understood in view of the description and drawings provided herein.

The description and drawings provided herein are for exemplary purposes and are not intended to limit the scope of the present invention. For example, the disclosed system and method may be used to form a torque transducer having axially polarized magnetically conditioned regions, wherein adjustment factors calculated to prevent undesired circumferentially or radially polarized magnetic field components are applied to reduce rotation noise.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method for manufacturing a magnetoelastic torque sensing device, the method comprising the steps of:
    forming an initial magnetically conditioned region at a first location on magnetoelastic element;
    measuring magnetic fields produced by various portions of the initial magnetically conditioned region;
    calculating adjustment factors based on the measured magnetic fields; and
    using the calculated adjustment factors to form a final magnetically conditioned region at the first location on the magnetoelastic element.

2. The method of claim 1, wherein the step of forming the initial magnetically conditioned region includes positioning a permanent magnet in proximity to the magnetoelastic element and rotating the magnetoelastic element about a central axis, and
    wherein the step of forming the final magnetically conditioned region includes positioning the permanent magnet in proximity to the magnetoelastic element and rotating the magnetoelastic element about the central axis.

3. The method of claim 2, wherein the step of forming the final magnetically conditioned region includes adjusting an angular offset of the permanent magnet based on the adjustment factors during the rotation of the magnetoelastic element.

4. The method of claim 2 further comprising the step of providing a solenoid around the permanent magnet,
    wherein the step of forming the final magnetically conditioned region includes applying an electrical current to the solenoid and adjusting the value of the electrical current based on the adjustment factors during the rotation of the magnetoelastic element.

5. The method of claim 2 further comprising the step of providing a solenoid in proximity to, but not around, the permanent magnet,
    wherein the step of forming the final magnetically conditioned region includes applying an electrical current to the solenoid and adjusting the value of the electrical current based on the adjustment factors during the rotation of the magnetoelastic element.

6. The method of claim 1 further including the step of the step of removing the initial magnetically conditioned region from the magnetoelastic element.

7. The method of claim 6, wherein the step of removing the initial magnetically conditioned region from the magnetoelastic element includes positioning an AC magnetic field source in proximity to the magnetoelastic element and rotating the magnetoelastic element about a central axis.

8. The method of claim 1, wherein the step of measuring magnetic fields comprises substeps of:
    (a) placing the magnetoelastic element in a quiescent state;
    (b) obtaining a discrete magnetic field measurement corresponding to an angular position of the magnetoelastic element;
    (c) slightly rotating the magnetoelastic element about a central axis; and
    (d) repeating substeps (a) through (c) until the magnetoelastic element has undergone one full 360 degree rotation.

9. The method of claim 1 further comprising the step of creating a data map,
    wherein the data map includes, for each of the various portions of the initial magnetically conditioned region, a magnetic field measurement and a corresponding angular position measurement.

10. A magnetoelastic torque sensing device manufactured by the method of claim 1.

11. The magnetoelastic torque sensing device of claim 10, wherein the magnetoelastic element comprises a disk-shaped member.

12. The magnetoelastic torque sensing device of claim 10, wherein the magnetoelastic element comprises a shaft.

13. A system for manufacturing a magnetoelastic torque sensing device, the system comprising:
    a DC magnetic field source;
    a holder configured to hold the DC magnetic field source in proximity to a magnetoelastic element;
    a magnetic field sensor configured to sense a magnetic field produced by the magnetoelastic element; and
    a computer system configured to control a position of the holder based on information received from the magnetic field sensor.

14. The system of claim 13, wherein the holder is configured to be rotatable about an axis that is perpendicular to a surface of the magnetoelastic element.

15. The system of claim 13, wherein the holder is configured to be rotatable about an axis that is perpendicular to a plane that is tangent to a surface of the magnetoelastic element.

16. The system of claim 13 further comprising a position sensor for sensing an angular position of the magnetoelastic element.

17. The system of claim 13, wherein the computer system is further configured to receive electrical signals outputted by the magnetic field sensor.

18. The system of claim 17, wherein the computer system is further configured to calculate adjustment factors based on the electrical signals outputted by the magnetic field sensor, and wherein the computer system is further configured to control the position of the holder based on the adjustment factors.

19. A system for manufacturing a magnetoelastic torque sensing device, the system comprising:
   a permanent magnet configured to be positioned in proximity to a magnetoelastic element;
   a solenoid having a central axis that is perpendicular to a magnetic orientation of the permanent magnet;
   a magnetic field sensor configured to sense a magnetic field produced by the magnetoelastic element; and
   a computer system configured to control an electrical current applied to the solenoid based on information received from the magnetic field sensor.

20. The system of claim 19, wherein the solenoid is disposed around the permanent magnet.

21. The system of claim 19, wherein the solenoid is disposed in proximity to, but not around, the permanent magnet.

22. The system of claim 19 further comprising a position sensor for sensing an angular position of the magnetoelastic element.

23. The system of claim 19, wherein the computer system is further configured to receive electrical signals outputted by the magnetic field sensor.

24. The system of claim 23, wherein the computer system is further configured to calculate adjustment factors based on the electrical signals outputted by the magnetic field sensor, and wherein the computer system is further configured to control the electrical current applied to the solenoid based on the adjustment factors.

25. A method for manufacturing a magnetoelastic torque sensing device, the method comprising the steps of:
   positioning a DC magnetic field source in proximity to a magnetoelastic element such that the DC magnetic field source is capable of forming a magnetically conditioned region on the magnetoelastic element;
   positioning a magnetic field sensor in proximity to the magnetoelastic element such that the magnetic field sensor is capable of measuring magnetic fields produced by various portions of the magnetically conditioned region;
   rotating the magnetoelastic element about an axis;
   measuring magnetic fields produced by various portions of a magnetically conditioned region on the magnetoelastic element;
   calculating adjustment factors based on the measured magnetic fields; and
   adjusting the DC magnetic field source based on the calculated adjustment factors.

26. The method of claim 25, wherein the steps of rotating the magnetoelastic element, measuring magnetic fields, calculating adjustment factors, and adjusting the DC magnetic field source are performed simultaneously.

27. The method of claim 25, wherein the DC magnetic field source includes a permanent magnet, and wherein the step of adjusting the DC magnetic field source includes adjusting an angular offset of the permanent magnet based on the adjustment factors.

28. The method of claim 25, wherein the DC magnetic field source includes a permanent magnet having a solenoid disposed therearound such that a central axis of the solenoid is perpendicular to a magnetic orientation of the permanent magnet, and wherein the step of adjusting the DC magnetic field source includes applying an electrical current to the solenoid and adjusting the value of the electrical current based on the adjustment factors.

* * * * *